(12) United States Patent
Ogino et al.

(10) Patent No.: US 7,424,769 B2
(45) Date of Patent: Sep. 16, 2008

(54) BOOT BAND

(75) Inventors: Takashi Ogino, Nagano (JP); Takashi Morimoto, Nagano (JP); Hiroshi Ikeda, Nagano (JP); Toshiya Migita, Nagano (JP)

(73) Assignee: NHK Spring Co., Ltd. (JP)

( * ) Notice: Subject to any disclaimer, the term of this patent is extended or adjusted under 35 U.S.C. 154(b) by 294 days.

(21) Appl. No.: 10/560,355

(22) PCT Filed: Jun. 4, 2004

(86) PCT No.: PCT/JP2004/007836

§ 371 (c)(1),
(2), (4) Date: Dec. 12, 2005

(87) PCT Pub. No.: WO2004/111470

PCT Pub. Date: Dec. 23, 2004

(65) Prior Publication Data

US 2006/0123604 A1    Jun. 15, 2006

(30) Foreign Application Priority Data

Jun. 11, 2003  (JP) ............................ 2003-166978

(51) Int. Cl.
*F16B 2/08* (2006.01)

(52) U.S. Cl. .................................. 24/20 R

(58) Field of Classification Search ............... 24/20 R, 24/20 CW, 20 EE, 20 TT, 20 W
See application file for complete search history.

(56) References Cited

U.S. PATENT DOCUMENTS

RE33,744 E    11/1991  Oetiker
5,138,746 A    8/1992  Ojima et al.

FOREIGN PATENT DOCUMENTS

JP    61-236908    10/1986

OTHER PUBLICATIONS

Abstract of EP 0 344 132 A Nov. 29, 1989 Arcelli & Bernacchi.
Abstract of JP 2002 130217 A Sep. 4, 2002.
Abstract of JP 08 232919 A Jan. 31, 1997.
Abstract of EP 2002130217 Sep. 5, 2002 Kenroukku KK.
Abstract of EP 08232919 Oct. 9, 2006 NHK Spring Co Ltd.
Microfilm of the specification and drawings annexed to the request of Japanese Utility Model Application No. 36596/1990 (Laid-open No. 127806/1991 (NSK Ltd.), Dec. 24, 1991 Figs. 1 to 3.
Microfilm of the specification and drawings annexed to the request of Japanese Utility Mode Application No. 46867/1990 (Laid-open No. 5504/1992 (Yugen Kaisha Takomiya), Jan. 20, 192 Figs. 1 to 8.

*Primary Examiner*—James R Brittain
(74) *Attorney, Agent, or Firm*—Lowe Hauptman Ham & Berner, LLP

(57) ABSTRACT

Buckling is prevented at the time of clamping a band body, and the band body is made short. A boot band comprises a band body 31 that is wound in a ring shape—around a member to be clamped—in such a way that the outer-layer portion 32 of the band body 31 overlaps the inner-layer portion 33 of the band body 31, engagement holes 34, 35 that are formed in the outer-layer portion 32, engagement pawls 36, 37 that are formed on the inner-layer portion 33 and that are to be engaged with the engagement holes 34, 35, so that the band body 31 is maintained in a clamped condition, a first boot-band pawl 41 that is formed on the to and at the end of the outer-layer portion 32, a planar end 39 that is formed closer to the end of the outer-layer portion 32 than the first boot-band pawl 41 is, a second boot-band pawl 38 that (1) is formed in the inner-layer portion 33, (2) has (a) an opening 38*a* wherein the terminal end 39 can be inserted, and (b) a pressing portion 38*b* for pressing—from the outside—the terminal end 39 that is inserted in the opening 38*a*, and (3) clamps the band body 31 together with the first boot-band pawl 41, and a slit 42 that is formed between the first boot-band pawl 41 and the engagement hole 34 in the outer-layer portion 32.

16 Claims, 7 Drawing Sheets

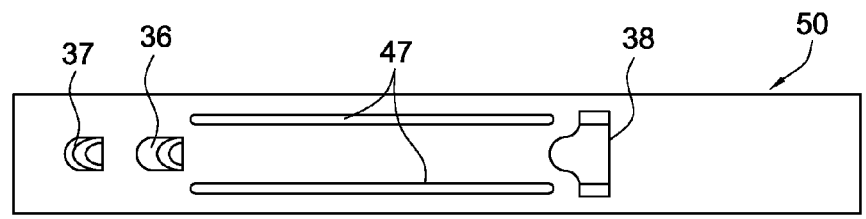
FIG. 5
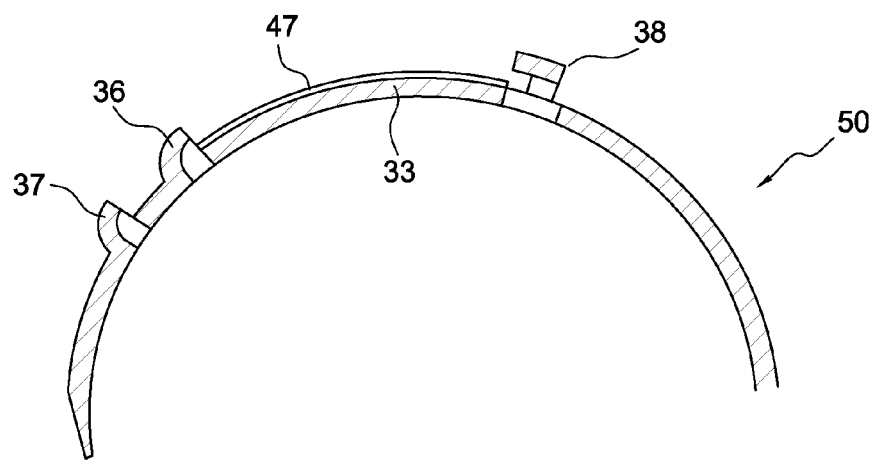
FIG. 6
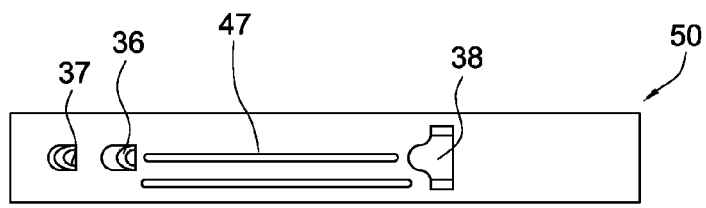 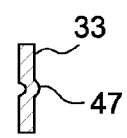
FIG. 7a    FIG. 7b
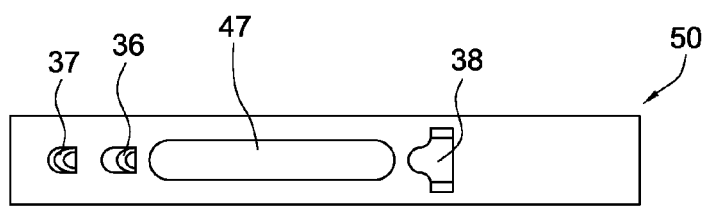 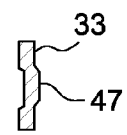
FIG. 8a    FIG. 8b

BOOT BAND

CROSS-REFERENCE TO RELATED APPLICATIONS

The present application is based on International Application No. PCT/JP2004/007836 filed on Jun. 4, 2004 which in turn corresponds to Japanese Application No. 2003-166978 filed on Jun. 11, 2003, and priority is hereby claimed under 35 USC § 119 based on these applications. Each of these applications are hereby incorporated by reference in their entirety into the present application.

FIELD OF THE INVENTION

This invention relates to a boot band for clamping and fixing on another member a tube-like or boot-like member made of rubber, resin, or the like.

BACKGROUND OF THE INVENTION

A boot band is used, for example, to clamp a boot that covers the power transmission of an automobile, so that (1) internal grease and the like are prevented from flowing out from the boot, and (2) water and foreign matter are prevented from infiltrating into the boot. Also, because the boot band is used to clamp the member to be clamped under the condition that the boot band is wound around the member to be clamped, one pair of boot-band pawls are provided on the boot band so that a clamping tool can be hooked onto the boot-band pawls to clamp the boot band.

FIGS. 11 and 12 show a first conventional boot band 1 (see Patent Document 1), and FIGS. 13 and 14 show a second conventional boot band 2 (see Patent Document 2). The boot band 1 or 2 consists of a band body 3 made of a thin metallic sheet, and is wound in a ring-like form so as to clamp the member in such a way that the boot band is wrapped completely around the member to be clamped. Therefore, when the band body 3 is wound (around the member to be clamped), the winding is done in such a way that the outer-layer portion of the band body 3 overlaps the inner-layer portion of the band body 3. Therefore, an outer layer portion 4 and an inner-layer portion 5 are formed.

In the first conventional boot band 1, a first boot-band pawl 6 is formed on the outer-layer portion 4, and a second boot-band pawl 7, which forms a pair with the first boot-band pawl 6, is formed on the inner-layer portion 5. Engagement holes 8 and 9 are formed in the area between the first boot-band pawl 6 and the end (free end) of the outer-layer portion 4. The engagement hole 8 is longer than the engagement hole 9, and the engagement hole 8 is also used as a temporary-tacking hole for temporarily tacking the band body 3. A second boot-band pawl 7, a temporary-tacking hook 10, and engagement pawls 11, 12 are sequentially arranged on the inner-layer portion 5 of the boot band 1 in the lengthwise direction of the band body 3 (in the clockwise direction in FIG. 11).

After the boot band 1 is wound like a ring as shown in FIG. 11, the second boot-band pawl 7 and the temporary-tacking hook 10 are inserted into the engagement hole 8 of the outer-layer portion 4. Then, clamping tools (not shown) are hooked onto a pair of the boot-band pawls 6 and 7, and the boot-band pawls 6 and 7 are pressed toward each other in such a way that the distance between the boot-band pawls 6 and 7 shortens, so that the diameter of the ring-like band body 3 is reduced. The arrows F in FIG. 12 indicate the directions of clamping. By this pressing, the engagement pawl 11 is inserted into and engaged with the engagement hole 8, and the engagement pawl 12 is inserted into and engaged with the engagement hole 9, so that a clamping condition—whereby the diameter of the boot band is reduced—is achieved.

At this time, there is a space between the end section (i.e., the section near the engagement hole 9) of the outer-layer portion 4 and the inner-layer portion 5. The top of the end section of the outer-layer portion 4 is pressed from its outer peripheral side toward the center of said ring-like form. While maintaining such a pressed condition, the engagement pawl 12 is engaged with the engagement hole 9 so as to achieve final clamping.

As shown in FIGS. 13 and 14, in the second conventional boot band 2, a first boot-band pawl 21 is formed on the top-and toward the end of the outer-layer portion 4, and a second boot-band pawl 22, which forms a pair with the first boot-band pawl 21, is formed on the inner-layer portion 5. Also, the first boot-band pawl 21 and engagement holes 23, 24, and 25 are sequentially formed on the outer-layer portion 4 along the lengthwise direction of the band body 3 from the first boot-band pawl 21 side (in the counterclockwise direction in FIGS. 13 and 14), and engagement holes 26, 27, and 28 corresponding to these engagement holes 23, 24, and 25 are formed on the inner-layer portion 5.

The second boot-band pawl 22 is press molded so as to rise outward in the radial direction, and an engagement hole 22a, which opens toward the first boot-band pawl 21, is formed in the second boot-band pawl 22. Also, the top end (free end) of the first boot-band pawl 21 of the outer-layer portion 4 serves as a terminal end 29 that extends in a flat form and that is inserted into the second boot-band pawl 22 through the engagement hole 22a.

As shown in FIG. 14, the band body 3 is placed—in a ring-like form—onto the member to be clamped so as to clamp the second conventional boot band 2 around the member to be clamped. Under this condition, a pair of pawls 15a and 15b of a clamping tool 15 are hooked and locked onto the boot-band pawls 21 and 22, so that the boot-band pawls 21 and 22 are pressed toward each other in the directions shown by arrows F, and whereby the diameter of the boot band is reduced. At the time of such pressing, while the terminal end 29 is inserted—in the direction shown by the arrow F—into the engagement hole 22a, the engagement pawls 26, 27, and 28 are engaged with their corresponding engagement holes 23, 24i and 25, thus achieving a clamping condition.

Patent Document 1: Specification of U.S. Pat. Re. No. 33744

Patent Document 2: Publication of Japanese Patent No. 3001266

In the first conventional boot band 1, shown in FIGS. 11 and 12, it is necessary that a load be applied onto the band body 3 in the circumferential direction by using a clamping tool, that the outer-layer portion 4 be pressed inward while maintaining the above-mentioned loading condition, and clamping be done while maintaining the above-mentioned pressing condition. As such, two actions—one in the circumferential direction, and one inward—are necessary at the time of clamping, which makes the clamping operation troublesome. In addition, because two actions are necessary, there is the following problem: the time needed for a clamping operation is needlessly long, which adversely impacts workability.

In contrast, in the second conventional boot band 2, shown in FIGS. 13 and 14, because the terminal end 29 is inserted into the engagement hole of the second boot-band pawl 22, the operation of pressing the outer-layer portion 4 inward is not necessary. Therefore, clamping can be performed by only one action, and clamping workability is improved in comparison with that of the first conventional boot band 1.

However, in the case of the boot band 2 shown in FIGS. 13 and 14, the inner-layer portion 5 might buckle at the time of clamping.

FIG. 15 shows how such buckling 19 can occur. When clamping pressure is applied to the pair of boot-band pawls 21 and 22, the outer-layer portion 4 of the boot band 2 slides in the direction in which the load is applied. By this sliding, the outer-layer portion 4 climbs over the engagement pawl 26 of the inner-layer portion 5. However, at the time of this climbing over, the outer-layer portion 4 is hooked onto the top part of the engagement pawl 26, with which it becomes locked. By this locking, a load—which originally is to be used in sliding the outer-layer portion 4 and reducing the diameter of the boot band—is applied, via the outer-layer portion 4, onto the engagement pawl 26 of the inner-layer portion 5.

Thus, even when a load is applied onto the pair of boot-band pawls 21 and 22, the condition becomes the same as that when the load is being received between the second boot-band pawl 22 and the engagement pawl 26 of the inner-layer portion 5. When the clamping load on the band body 3 exceeds the buckling-resistance capability of the band body 3, buckling 19 occurs on the boot band 3 between the second boot-band pawl 22 and the engagement pawl 26 of the inner-layer portion 5.

FIG. 16 shows a countermeasure to prevent such buckling 19. That is, the distance L1 between the engagement pawl 26 of the inner-layer portion 5 and the first boot-band pawl 21 of the outer-layer portion 4 is made to be long. As a result, the terminal end 29 at the tip of the outer-layer portion 4 can clamp the inner-layer portion 5 while pressing that inner-layer portion 5 from the outside. Thus, buckling of the inner-layer portion 5 is prevented, and insertion of the terminal end 29 into the engagement hole of the second boot-band pawl 22 is facilitated.

However, because when the countermeasure shown in FIG. 16 is taken, the distance L1 between the engagement pawl 26 of the inner-layer portion 5 and the first boot-band pawl 21 of the outer-layer portion 4 is long, the overlapping portion between the outer-layer portion 4 and the inner-layer portion 5 also must be long, resulting in a need for a longer band body 3. As a result, the following problems arise: (1) the boot band becomes heavy, (2) its cost increases, and (3) there is limitation as to how much the diameter of the band can be reduced.

SUMMARY OF THE INVENTION

The current invention has been made in consideration of the above-mentioned problems of the conventional boot bands. One objective of the present invention is to provide a boot band that features improved easiness in handling, and wherein—even though the boot band's structure is similar to that shown in FIGS. 13 and 14, where clamping the band body can be done in one action—buckling does not occur, and the length of the band can be shortened.

To achieve the above-mentioned objective, one object of this invention is to provide a boot band, having:

1. a band body that is wound as a ring around a member to be clamped, in such a way that an outer-layer portion overlaps an inner-layer portion of the band, 2. an engagement hole that is formed in the outer-layer portion of the band, 3. an engagement pawl that is formed in the inner-layer portion of the band and that engages with said engagement hole so as to maintain the band body in a clamped condition, 4. a first boot-band pawl that is formed on the top at and the end of the outer-layer portion of the band, 5. a planar terminal end that
   a. is formed in the outer-layer portion of the band, and
   b. is located closer/nearer to the top end of the outer-layer portion than the first boot-band pawl is, 6. a second boot-band pawl that
   a. is formed in the inner-layer portion of the band,
   b. has (1) an opening into which the terminal end can be inserted, and (2) a pressing part that presses—from the outside—the terminal end that is inserted into said opening, and
   c. clamps the band body together with the first boot-band pawl, and 7. a slit that is formed between the first boot-band pawl and the engagement hole in the outer-layer portion of the band.

According to another object of the invention, the band body that is in the form of a ring is clamped by the first boot-band pawl and the second boot-band pawl, so that the terminal end, which is located closer/nearer to the top end of the outer-layer portion than the first boot-band pawl is, is inserted into and pressed inside the second boot-band pawl. Thus, clamping can be performed by one action without needing to press the outer-layer portion against the inner-layer portion, thereby improving workability.

Still another object of the invention, a slit is formed between the first boot-band pawl and the engagement hole. Therefore, the rigidity is low in the area where the first boot-band pawl, the slit, and the engagement hole are formed. Thus, a clamping force that is applied onto the pair of boot-band pawls makes it possible to press the top of the end section of the outer-layer portion against the inner-layer portion. That is to say, it is possible to press against a portion that tends to buckle with the top of the end section of the outer overlap portion. At the same time, the load—which (1) is applied by the outer-layer portion, and (2) presses the top part of the engagement pawl inward—also is reduced. This can prevent buckling of the inner-layer portion.

The amount of flexure—which is necessary for performing the above-mentioned pressing—is inversely proportional to the cross-sectional second moment in the above-mentioned portion. And because the cross-sectional second moment is reduced due to the slit formed in this portion, the flexure can be made large. As a result, it is not necessary that the distance between the first boot-band pawl of the outer-layer portion and the engagement pawl of the inner-layer portion be long for the purpose of obtaining adequate flexure. Thus, the distance between the first boot-band pawl of the outer-layer portion and the engagement pawl of the inner-layer portion can be short. As a result, the length of the band body can be reduced.

Still another object of the invention is to provide a boot band, having:

1. a band body that is wound as a ring around a member to be clamped, in such a way that the band body's outer-layer portion overlaps the inner-layer portion of the band body, 2. an engagement hole that is formed in the outer-layer portion of the band, 3. an engagement pawl that is formed in the inner-layer portion of the band and that engages with said engagement hole so as to maintain the band body in a clamped condition, 4. a first boot-band pawl that is formed on the top at and the end of the outer-layer portion of the band, 5. a planar terminal end that
   a. is formed in the outer-layer portion of the band, and
   b. is located closer/nearer to the top end of the outer-layer portion than the first boot-band pawl is, 6. a second boot-band pawl that
   a. is formed in the inner-layer portion of the band,
   b. has (1) an opening into which the terminal end can be inserted, and (2) a pressing part that presses—from the outside—the terminal end that is inserted into said opening, and
   c. clamps the band body together with the first boot-band pawl,
7. a slit that is formed between the first boot-band pawl and the engagement hole in the outer-layer portion of the band, and
8. a temporary-tacking pawl that
   a. is formed on the inner-layer portion of the band, and
   b. is inserted into and engaged with said slit, so that the band body is made to be in a temporary-tacking condition in a ring-like form.

The terminal end that is to be engaged with the second boot-band pawl is formed in the outer-layer portion; therefore, clamping can be performed in one action. The slit is formed between the first boot-band pawl and the engagement hole; it is therefore possible to press the top of the end section of the outer-layer portion against the inner-layer portion, so as to prevent buckling the inner-layer portion. In addition, thanks to the above-mentioned slit, the flexure can be increased, and therefore the length of the band body can be shortened.

The, temporary-tacking pawl is configured to be inserted into and engaged with the above-mentioned slit. As a result, a condition where the band body is temporary-tacked in a ring-like form can be stabilized. Also, because the temporary-tacking pawl guides the clamping of the band body widthwise, the band body can be smoothly clamped.

Another object of the invention is to provide a boot band having:
1. a band body that is wound as a ring around a member to be clamped, in such a way that the band body's outer-layer portion overlaps the inner-layer portion of the band body,
2. an engagement hole that is formed in the outer-layer portion of the band,
3. an engagement pawl that is formed in the inner-layer portion of the band and that engages with said engagement hole so as to maintain the band body in a clamped condition,
4. a first boot-band pawl that is formed on the top at and the end of the outer-layer portion of the band,
5. a planar terminal end that
   a. is formed in the outer-layer portion of the band, and
   b. is located closer/nearer to the top end of the outer-layer portion than the first boot-band pawl is,
6. a second boot-band pawl that
   a. is formed in the inner-layer portion of the band,
   b. has (1) an opening into which the terminal end can be inserted, and (2) a pressing part that presses—from the outside—the terminal end that is inserted into said opening, and
   c. clamps the band body together with the first boot-band pawl, and
7. a reinforcing part that is formed between the second boot-band pawl and the engagement pawl.

Also, the terminal end to be engaged with the second boot-band pawl is formed in the outer-layer portion; thus, clamping can be performed in one action.

In addition, the reinforcing part is formed between the second boot-band pawl and the engagement pawl. As a result, the rigidity of this portion is high, and the cross-sectional second moment of this portion is large. And because a load that causes buckling is proportional to the section two-dimensional moment, even if a load—by which the outer-layer portion presses against the engagement pawl—is generated due to flexure of the outer-layer portion, buckling is prevented from occurring, because the buckling-resistance force is large. It is not necessary to take into consideration the flexure of the outer-layer portion to prevent buckling, and therefore the length of the band can be shortened.

Still another object of the invention is to provide a boot band having a reinforcing part, and wherein said reinforcing part is a rib that is formed between the second boot-band pawl and the engagement pawl, and in the circumferential direction.

By forming a rib as the reinforcing part, the reinforcing part can be formed easily.

Still another object of the invention is to provide a boot band having an enlarged portion—which is on the side of the engagement hole, has a shape that corresponds to that of the rear end of the engagement pawl, and that is enlarged outward in the radial direction—is formed at said engagement hole's end face that is farther from the end of the outer-layer portion of the band.

Still another object of the invention is to provide a boot band having an enlarged portions and wherein the enlarged portion—which is on the side of the slit, has a shape that corresponds to that of the back face of the engagement pawl, and is enlarged outward in the radial direction—is formed at said slit's end face that is farther from the end of the outer-layer portion of the band.

If the engagement-hole-side enlarged portion and the slit-side enlarged portion are formed, the clamping operation can be performed smoothly, and an unnecessary load does not result. Therefore, buckling can be prevented even more surely.

Still another object of the invention is to provide a boot band having an outer layer portion, which includes an end-section top portion wherein the end-section top portion of the outer-layer portion is curved inward in the radial direction and has a curvature larger than that of the ring-diameter of the band body. The end-section top portion of the outer-layer portion—which has a large curvature—surely presses the inner-layer portion at the time of clamping the band body. Therefore, buckling of the inner-layer portion does not occur.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 5 is a plan view of a third embodiment of the present invention.

FIG. 6 is a cross-sectional view of the arrangement depicted in FIG. 5.

FIGS. 7(*a*) and (*b*) are a plan and a cross-sectional view of a variation of the third embodiment depicted in FIG. 6.

FIGS. 8(*a*) and (*b*) are plan and a cross-sectional view of another variation of the third embodiment.

Figure 1:
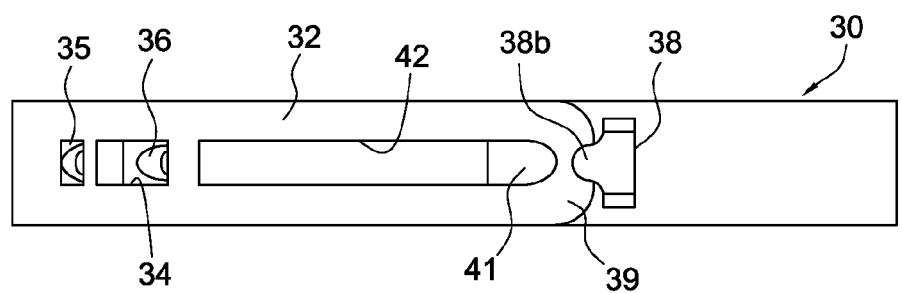
FIG. 1 is a plan view of the boot band according to a first embodiment of the present invention.

EXPLANATION OF NUMBERS IN THE DRAWINGS 30, 40, 50, 60, 70 Boot band
31 Band body
32 Outer-layer portion
33 Inner-layer portion
34, 35 Engagement hole
36, 37 Engagement pawl
38 Second boot-band pawl
38*a* Opening
38*b* Pressing part
41 First boot-band pawl
42 Slit
45 Temporary-tacking pawl
47 Rib
51 Slit-side enlarged portion
53 Engagement-hole-side enlarged portion
59 End-section top portion of outer-layer portion

DETAILED DESCRIPTION OF THE INVENTION

The current invention will now be explained in detail, with reference to the drawings showing the several embodiments. The same numbers are used for the same items in drawings of the different embodiments.

Embodiment 1

Figure 2:
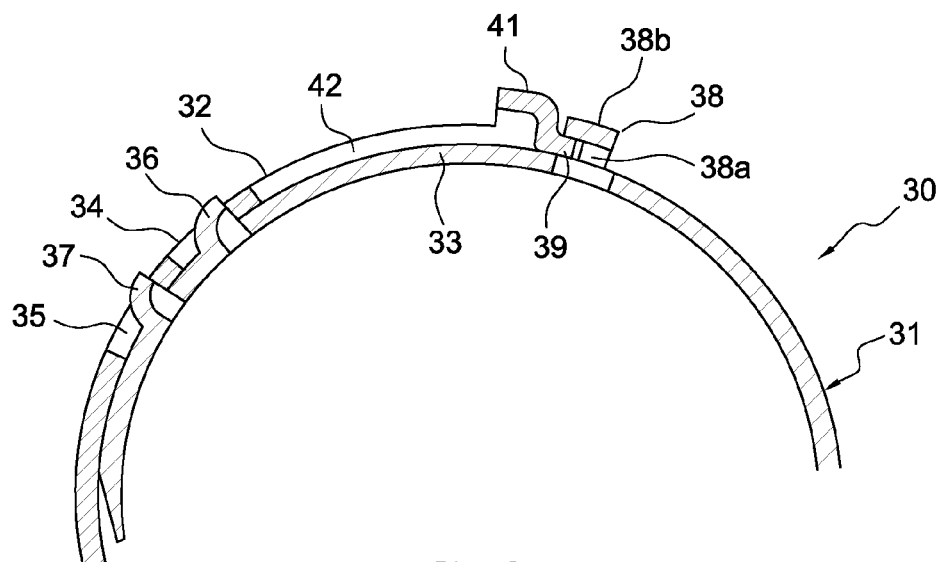
FIG. 2 is a cross-sectional view showing the clamping operation of the arrangement depicted in FIG. 1.

FIGS. 1 and 2 show a boot band 30 in Embodiment 1 of the present invention, which is formed with a belt-like band body 31.

The band body 31 is formed by press-punching a thin metallic plate into the form of a belt that is used for clamping a member to be clamped (not shown) under the condition that the band body 31 is wound—in the shape of a belt or a ring—around the member to be clamped. The band body 31, which is wound like a ring, is formed with an outer-layer portion 32 that overlaps an inner-layer portion 33, and, as described below, these outer-layer and inner-layer portions 32, 33 are pressed in the diameter-reducing direction, as to clamp the member to be clamped.

A first boot-band pawl 41 is formed on the top of the end section (free end side) of the outer-layer portion 32 of the band body 31 so as to rise outward in the radial direction. Also, the terminal end 39 extends in the longitudinal direction of the free end, which is located nearer to the top of the end section than the first boot-band pawl 41 is. The terminal end 39 is formed (1) in a planar shape, and (2) so as to face a second boot-band pawl 38, which will be described later.

In addition, engagement holes 34, 35 are sequentially formed in the lengthwise direction the outer-layer portion 32. The engagement holes 34, 35 are engaged with the below-described engagement pawls 36, 37, so as to maintain the band body in a clamped condition 31.

Engagement pawls 36, 37 are formed in the lengthwise direction in the inner-layer portion 33 of the band body 31. A second boot-band pawl 38—which forms a pair with the first boot-band pawl 41—is formed at a position adjacent to the engagement pawls 36, 37. The engagement pawls 36, 37 are formed so as to rise slantwise from the band body 31, and the rising ends of the engagement pawls 36, 37 are curved toward the second boot-band pawl 38. These engagement pawls 36, 37 are inserted into and engaged with the engagement holes 34, 35 of the outer-layer portion 32.

The second boot-band pawl 38 is formed so as to rise atop the inner-layer portion 33. The second boot-band pawl 38 has an opening 38*a* and a pressing part 38*b*. The opening 38*a* is open on the side of the first boot-band pawl 41, so that the above-mentioned end 39 can be inserted thereinto. The pressing part 38*b* continues from the opening 38*a* in the circumferential direction, and acts so as to press the terminal end 39—which is inserted in the opening 38*a*—from the outside.

In addition to the above, the boot band 30 in this embodiment is provided with a slit 42 that is formed between the first boot-band pawl 41 in the outer-layer portion 32 and the engagement hole 34 adjacent to said first boot-band pawl 41. The slit 42 has a predetermined width, and extends in the lengthwise direction of the band body 31. The slit 42 has a width of about one-third of the width of the band body 31, and it is positioned in the approximate center, widthwise, of the outer-layer portion 32. The slit 42 in the outer-layer portion 32 serves to reduce the rigidity in the portion between the first boot-band pawl 41 and the engagement hole 34 in the outer-layer portion 32, so that adequate flexure can be obtained in the portion between the first boot-band pawl 41 and the engagement hole 34.

Figure 14:
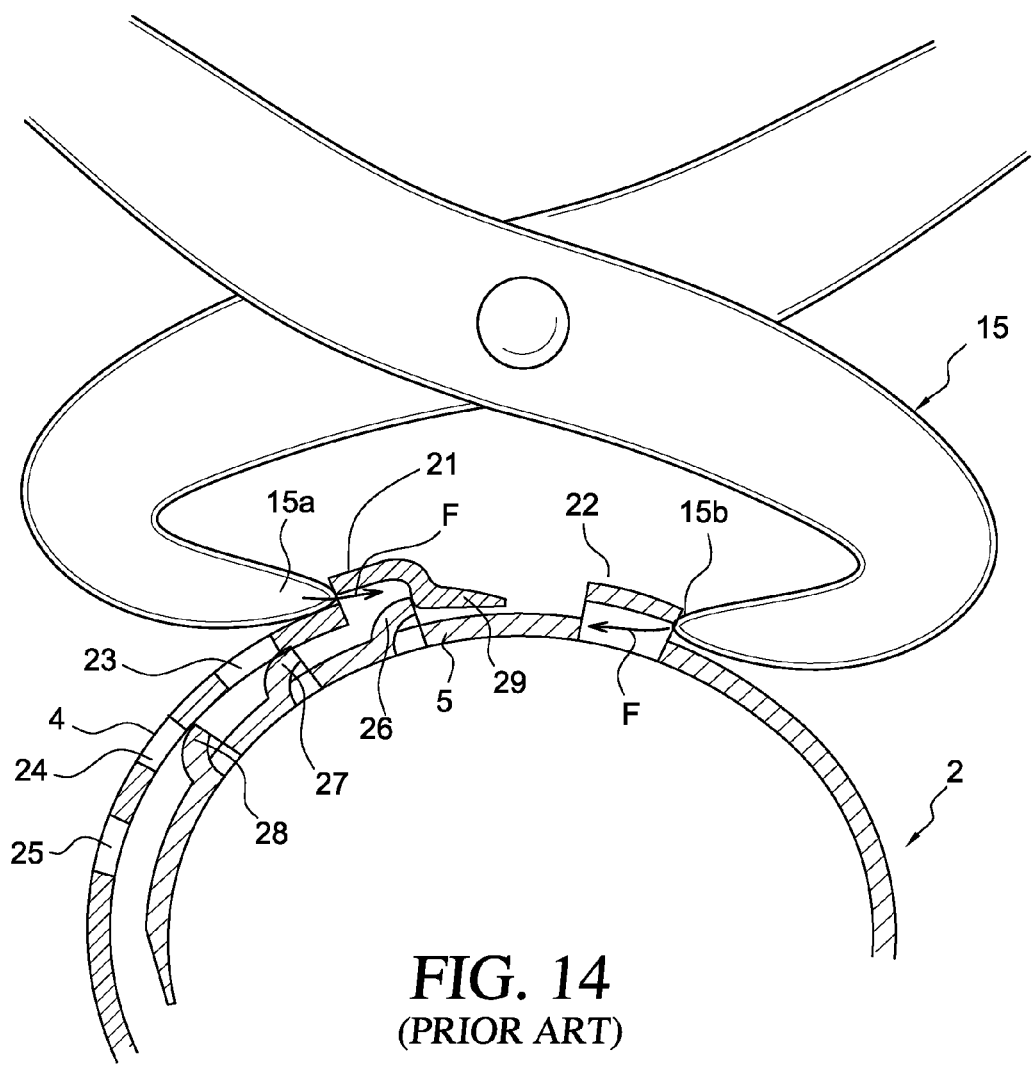
FIG. 14 is a cross-sectional view showing a clamping operation of the second conventional boot band.
Figure 15:
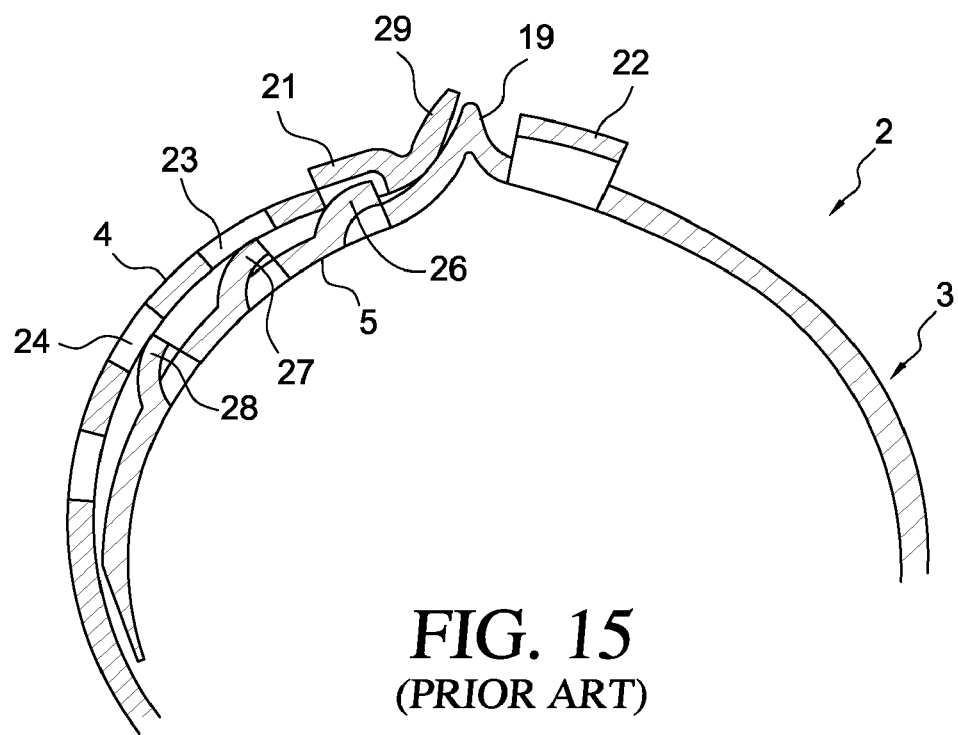
FIG. 15 is a cross-sectional view showing buckling.
Figure 16:
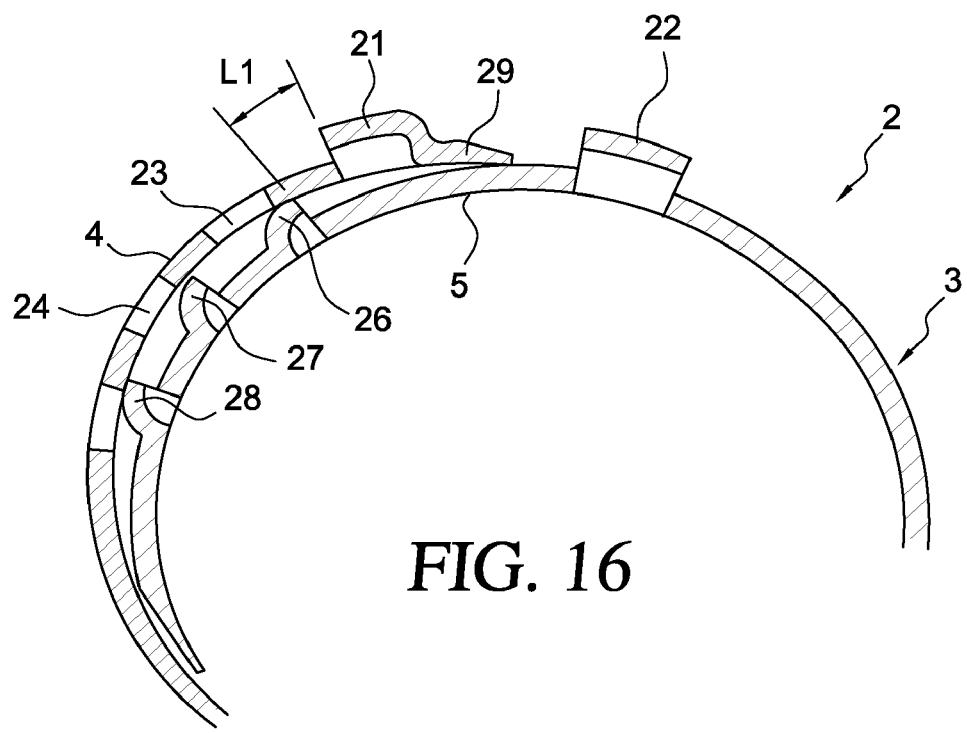
FIG. 16 is a cross-sectional view, where buckling is prevented in the second conventional boot band.

In order that the boot band 30 in this embodiment can be clamped, the boot band 30 is wound in the form of a ring in such a way that the outer-layer portion 32 overlaps the inner-layer portion 33 on the outer periphery of a member to be clamped. Under this condition, a clamping tool (see the clamping tool 15 in FIG. 14) is hooked onto the first boot-band pawl 41 and the second boot-band pawl 38, so that the outer-layer portion 32 and the inner-layer portion 33 are pressed in the diameter-reducing direction (i.e., toward each other) and then clamped. At the time of this clamping, the outer-layer portion 32 climbs over the engagement pawl 36 of the inner-layer portion 33, and a space having the height of the engagement pawl 36 is generated between the outer-layer portion 32 and the inner-layer portion 33, so that the outer-layer portion 32 becomes enlarged outward in the circumferential direction.

In this embodiment, the slit 42 is formed between the first boot-band pawl 41 and the engagement hole 34 in the outer-layer portion 32, resulting in low rigidity of this portion in the outer-layer portion 32. Due to the clamping force that clamps the boot-band pawls 41, 38, the top of the end section of the outer-layer portion 32 flexes toward the inner-layer portion 33, and thereby the end section of the outer-layer portion 32 is pressed against the inner-layer portion 33. Such pressing can prevent buckling from occurring in the inner-layer portion 33.

The flexure that is necessary for pressing the outer-layer portion 32 against the inner-layer portion 33 is inversely proportional to the cross-sectional second moment in the portion between the first boot-band pawl 41 and the engagement hole 34 in the outer-layer portion 32. By forming the slit 42 in this portion, the cross-sectional second moment is reduced. Accordingly, the flexure can be made large. Thus, it is not necessary that the distance between the first boot-band pawl 41 of the outer-layer portion 32 and the engagement pawl 36 of the inner-layer portion 33 be made long in order to obtain adequate flexure. Therefore, the distance between the first boot-band pawl 41 of the outer-layer portion 32 and the engagement pawl 36 of the inner-layer portion 33 can be shortened. As a result, the length of the band body 31 can be shortened.

In such an embodiment, the band body 31 can be shortened. Therefore, the boot band 31 can be lightweight, and the handling thereof is facilitated. Also, buckling does not occur even in a boot band that has a small diameter. In addition, in this embodiment, the first boot-band pawl 41 is positioned closer to the end of the top side than the engagement hole 34 is. Thus, by moving the first boot-band pawl 41, clamping can be performed in one action, resulting in improved workability.

Embodiment 2

Figure 3:
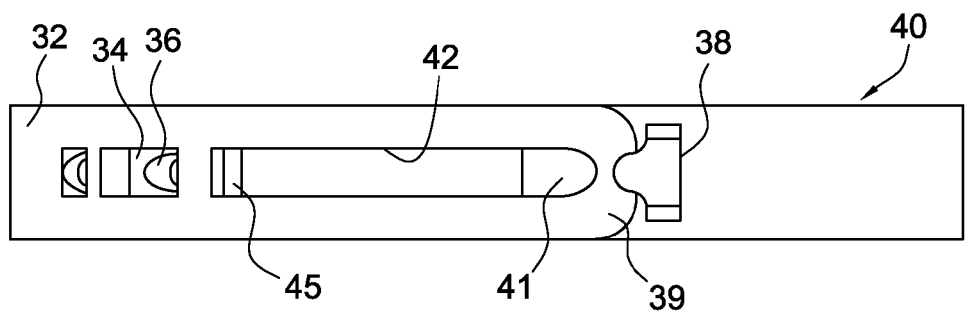
FIG. 3 is a plan view of another embodiment of the present invention.
Figure 4:
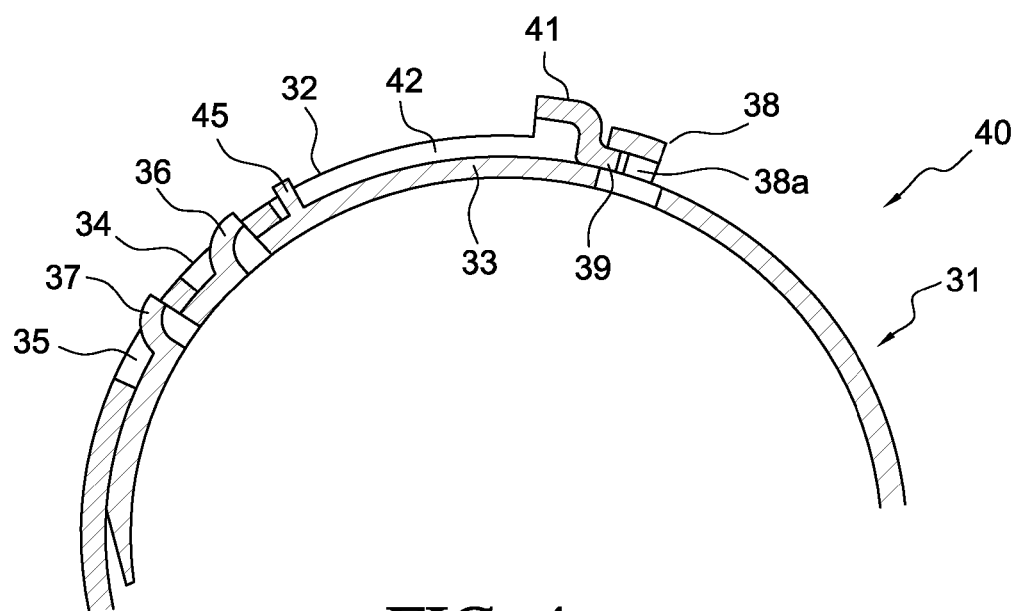
FIG. 4 is a cross-sectional view showing the clamping operation of the arrangement depicted in FIG. 3.

FIGS. 3 and 4 show Embodiment 2 of the present invention. The boot band 40 in this embodiment is provided with a temporary-tacking pawl 45 in addition to the elements of the boot band 30 in Embodiment 1.

In this embodiment, a temporary-tacking pawl 45 is formed in the inner-layer portion 33, near the engagement pawl 36 and between the second boot-band pawl 38 and the engagement pawl 36. The temporary-tacking pawl 45 is formed so as to rise from the above-mentioned portion of the inner-layer portion 33 outward in the radial direction, and its width is such that it is insertable into the slit 42 of the outer-layer portion 32. When the band body 31 is wound like a ring, the temporary-tacking pawl 45 is inserted into and engaged with the slit 42 of the outer-layer portion 32. Such engagement makes possible a temporarily-tacked ring-like condition of the band body 31.

In such an embodiment, when the temporary-tacking pawl 45 is inserted into and engaged with the slit 42, the band body 31 is temporarily tacked in a ring condition, so that the band body 31 can be handled under a stable ring condition, with the result that handling of the band body 31 is improved. Also, because the temporary-tacking pawl 45 guides the clamping of the band body 31 width-wise, the outer-layer portion 32 and the inner-layer portion 33 do not get dislocated in the width direction, so that the band body 31 can be smoothly clamped.

Also, in this embodiment, a slit 42 that is similar to that of Embodiment 1 is provided between the first boot-band pawl 41 and the engagement hole 34 in the outer-layer portion 32. Thereby, because the top of the end section of the outer-layer portion 32 is pressed, causing the outer-layer portion 32 to flex toward and to press against the inner-layer portion 33, buckling of the inner-layer portion 33 can be prevented. Further, because the cross-sectional second moment is reduced, a high degree of flexure can be obtained, so that the distance between the first boot-band pawl 41 of the outer-layer portion 32 and the engagement pawl 36 of the inner-layer portion 33 can be shortened, with the result that the length of the band body 31 can also be shortened. Further, as is similar to Embodiment 1, when the band body 31 is clamped there is no need for pressing the outer-layer portion 32 toward the inner-layer portion 33, and thus clamping can be performed in one action, resulting in improved workability.

Embodiment 3

FIGS. 5 and 6 show Embodiment 3 of the present invention. In this embodiment, a rib 47 is formed as a reinforcing part on the boot band 50.

The rib 47 is formed between the second boot-band pawl 38 and the engagement pawl 36 in the inner-layer portion 33 of the boot band. In this embodiment, the rib 47 is formed with two parallel thin protrusion bars rising outward in the radial direction. The parallel rib 47 is formed in the circumferential direction so as to have approximately the same length as that between the second boot-band pawl 38 and the engagement pawl 36.

The rib 47 is formed as a reinforcing part so that the rigidity of the boot band 50 between the second boot-band pawl 38 and the engagement pawl 36 in the inner-layer portion 33 becomes large, and so that the cross-sectional second moment also becomes large. Because a load that generates buckling is proportional to the cross-sectional second moment, even if such a load—by which the outer-layer portion 32 presses the engagement pawl 36 due to flexure of the outer-layer portion 32—is generated, the increased buckling-resistance force can prevent buckling. In such an embodiment, there is no need to take into consideration the flexure of the outer-layer portion 32, so as to prevent buckling, and thereby the length of the band body 31 can be shortened. Further, by combining the structure of this embodiment with that of Embodiment 1, even when the band diameter is small—namely, when the curvature is small—buckling can be prevented.

FIGS. 7 and 8 show, respectively, variations of this embodiment. In the embodiment of FIG. 7, the rib 47 is one thin protrusion bar that is formed so as to extend in the circumferential direction between the second boot-band pawl 38 and the engagement pawl 36, under the condition that the rib 47 is positioned at the approximate center of the width of the inner-layer portion 33. In the embodiment shown in FIG. 8, the rib 47 is a wide protrusion bar that is formed to extend in the circumferential direction between the second boot-band pawl 38 and the engagement pawl 36. With such a rib 47, because the rigidity between the second boot-band pawl 38 and the engagement pawl 36 can be made large, buckling can be prevented, and the band body 31 can be shortened.

In addition, a shape other than the shape of the rib 47 as shown in FIGS. 7 and 8 can be used for the reinforcing part. For example, an arc-shaped boss part can be formed at an appropriate location between the second boot-band pawl 38 and the engagement pawl 36.

Embodiment 4

Figure 9:
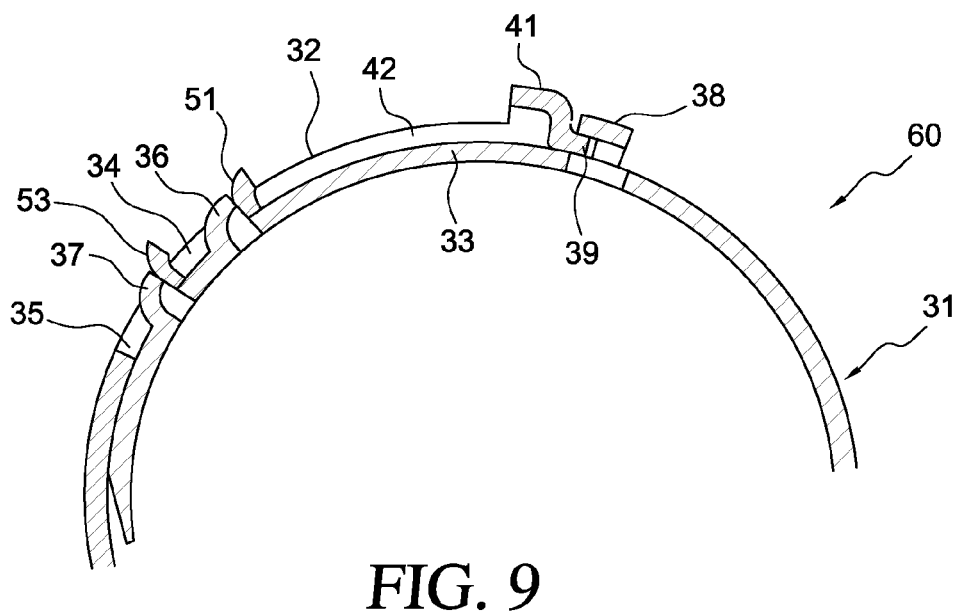
FIG. 9 is a cross-sectional view showing the clamping operation of a fourth embodiment of the invention.

FIG. 9 shows the boot band 60 according to Embodiment 4 of the present invention. A slit-side enlarged portion 51 and an engagement-hole-side enlarged portion 53 are formed in the boot band 60 of this embodiment.

The slit-side enlarged portion 51 is formed by enlarging its rear-end face (rear in terms of the clamping direction of the slit 42 of the outer-layer portion 32) outward in the radial direction. The engagement-hole-side enlarged portion 53 is formed by enlarging its rear-end face (rear in terms of the clamping direction of the engagement hole 34 of the outer-layer portion 32) outward in the radial direction. These enlarged portions 51 and 53 have curved shapes corresponding to back faces of the engagement pawls 36, 37. The engagement pawls 36, 37 can smoothly slide at the time of clamping.

Because of the slit-side enlarged portion 51 and the engagement-hole-side enlarged portion 53, the outer-layer portion 32 can smoothly climb over the engagement pawls 36, 37 of the inner-layer portion 33, so that an excessive load is not applied on the inner-layer portion 33 and the inner-layer portion 33 is not buckled. Also, the terminal end 39 can be pressed toward the inner-layer portion 33 before the outer-layer portion 32 climbs over the engagement pawls 36, 37. Thus, the length of the band body 31 can be shortened. Further, the outer-layer portion 32 flexes, so that the terminal end 39 can be pressed against the inner-layer portion 33. Therefore, buckling of the inner-layer portion 33 can be prevented more effectively.

Variations of the embodiment 4 of the invention will now be explained. The embodiment 4 includes the slit-side enlarged portion 51 and the engagement-hole-side enlarged portion 53. However, if the outer-layer portion 32 does not include the slit 42, there is no need for forming the slit-side enlarged portion 51. If the band body 31 has a plurality of engagement holes, an engagement-hole-side enlarged portion can be formed for each of the engagement holes. In such a case, the engagement-hole-side enlarged portion 53 can be formed on the side of the engagement hole 35.

Embodiment 5

Figure 10:
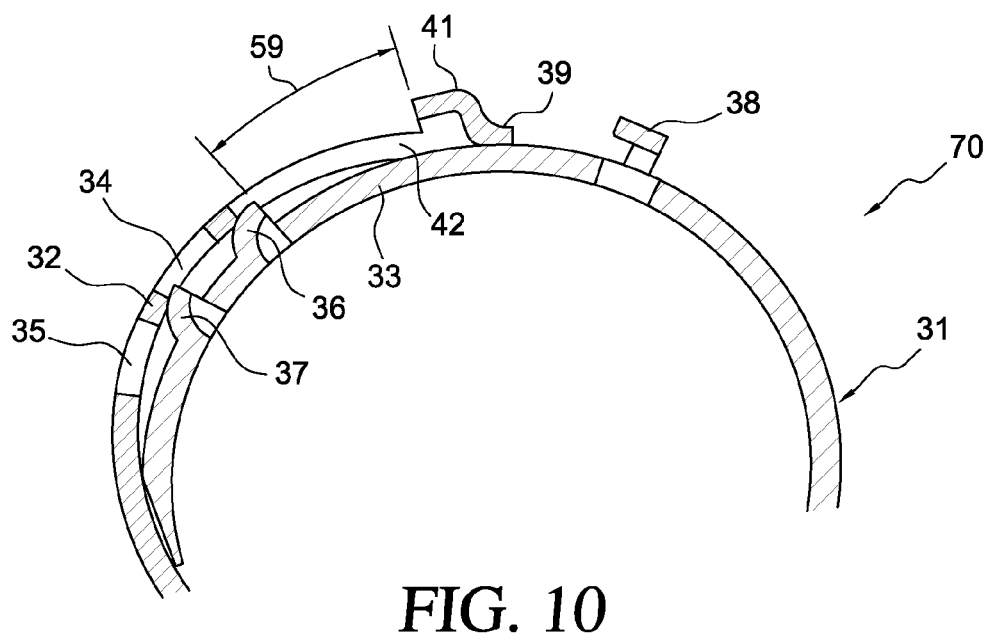
FIG. 10 is a cross-sectional view showing a clamping operation of the arrangement of a fifth embodiment of the invention.
Figure 11:
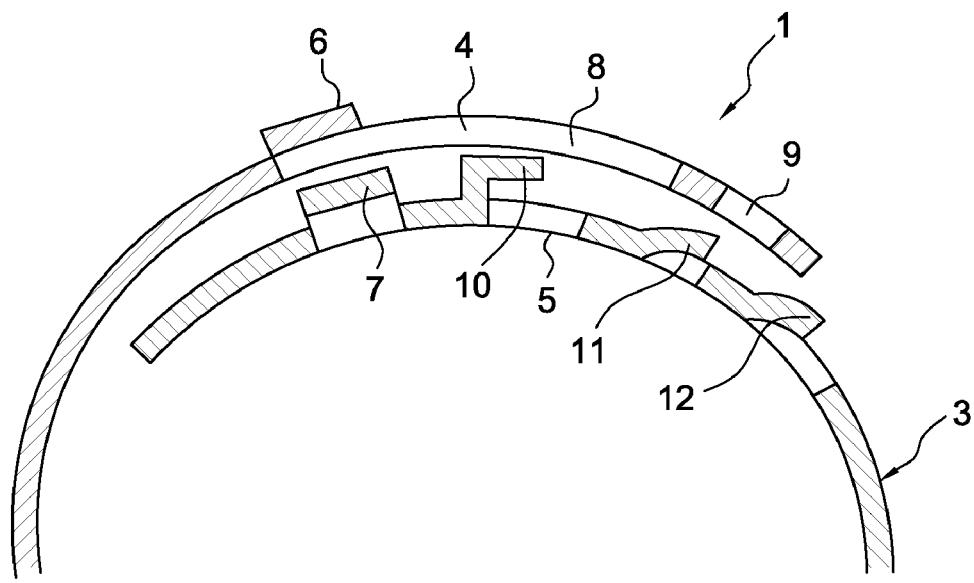
FIG. 11 is a cross-sectional view of the winding condition of a first conventional boot band.
Figure 12:
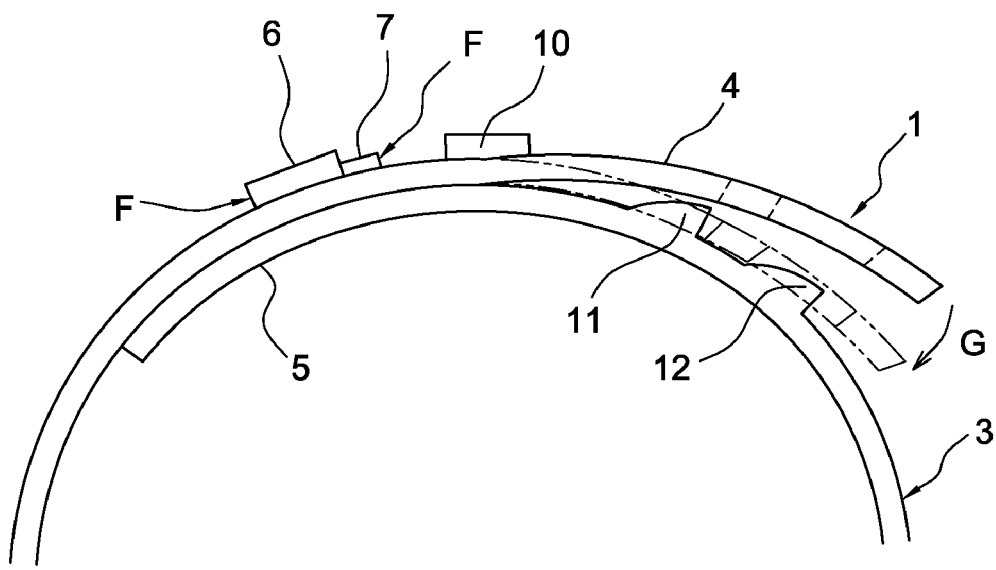
FIG. 12 is a cross-sectional view showing a clamping operation on the first conventional boot band.
Figure 13:
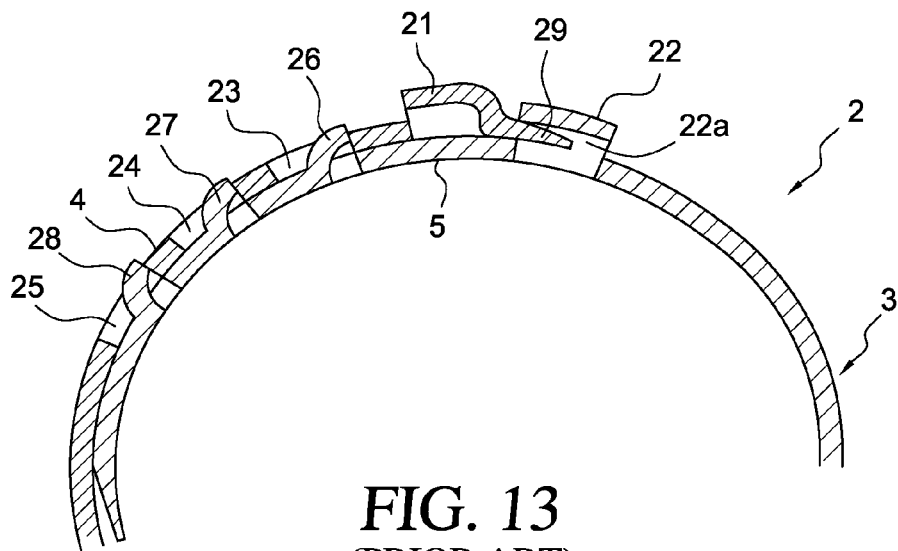
FIG. 13 is a cross-sectional view of a winding condition of a second conventional boot band.

FIG. 10 shows a boot band 70 in Embodiment 5 of the present invention.

In the boot band 70 of this embodiment, the portion of the end section of the outer-layer portion 32 has a high degree of curvature, and is designated by the number 59. In this embodiment, the end-section top portion 59 starts at the rear end of the first boot-band pawl 41, and ends at the end of the slit 42. The end-section top portion 59 of the outer-layer portion 32 is curved inward in the radial direction with a curvature larger than that of the ring diameter of the band body 31 that is wound around the member to be clamped.

Thus, because the end-section top portion 59 of the outer-layer portion 32 has a high degree of curvature, buckling of the inner-layer portion 33 can be prevented. In other words, because the end-section top portion 59 of the outer-layer portion 32 has a high degree of curvature, when the outer-layer portion 32 climbs over the engagement pawl 36, the terminal end 39 at the tip of the outer-layer portion 32 ideally comes in contact with the inner-layer portion 33, and acts so as to press against the inner-layer portion 33. This prevents buckling of the inner-layer portion 33.

In addition, such forming on the end-section top portion 59 can also be applied to a boot band of any of the Embodiments 1 to 4.

It will be readily seen by one of ordinary skill in the art that the present invention fulfils all of the objects set forth above. After reading the foregoing specification one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

INDUSTRIAL APPLICABILITY

Although the boot band of the present invention has a structure in which the band body can be clamped in one action, the band body can be surely clamped without causing buckling in the inner-layer portion of the boot band at the time of clamping the band body. Further, the band length of the boot band can be made short, and the handling property thereof is superior to that of a conventional boot band.

What is claimed is:

1. A boot band comprising:
a band body that rolls up for clamping on a member as a ring around a member to be clamped, in such a way that an outer-layer portion of said band body overlaps an inner-layer portion of said band body,
an engagement hole formed in the outer-layer portion of said band,
an engagement pawl formed in the inner-layer portion of said band body and that engages with said engagement hole so as to maintain said band body in a clamped condition,
a first boot-band pawl formed on a top end of the outer-layer portion of the band,
a planar end formed in said outer-layer portion of said band body, and is located nearer to said top end of said outer-layer portion than the first boot-band pawl is,
a second boot-band pawl formed in the inner-layer portion of said band body, has an opening into which said top end can be inserted, and a pressing part that presses, and from the outside, the end that is inserted into said opening, and clamps said band body together with said first boot-band pawl, and
a slit formed between said first boot-band pawl and said engagement hole in said outer-layer portion of said band body.

2. The boot band as described in claim 1, wherein an enlarged portion that is on a side of the engagement hole, which has a shape that corresponds to that of a rear face of the engagement pawl, and that is enlarged outward in the radial direction, is formed on an end face at a rear of said engagement hole.

3. The boot band of claim 2, wherein said enlarged portion is formed on an end face in the clamping direction of said engagement hole.

4. The boot band as described in claim 1, wherein
an enlarged portion that is on a side of the slit, has a shape that corresponds to that of a back face of the engagement pawl, is enlarged outward in the radial direction is formed on an end face at a rear of said slit.

5. The boot band of claim 4, wherein said enlarged portion is formed on an end face in the clamping direction of said engagement hole.

6. The boot band as described in claim 1, wherein an end-section top portion of said outer-layer portion is curved inward in the radial direction and has a curvature larger than that of a ring-diameter of the band body.

7. A boot band, for clamping on a member comprising:
a band body that rolls up as a ring around the member to be clamped, in such a way that a band body's outer-layer portion overlaps an inner-layer portion of the band body,
an engagement hole formed in said outer-layer portion of said band body,
an engagement pawl formed in said inner-layer portion of said band body and that engages with said engagement hole so as to maintain said band body in a clamped condition,
a first boot-band pawl formed on a top end of the outer-layer portion of said band body,
a planar end formed in said outer-layer portion of said band body, and is located nearer to the top end of the outer-layer portion than the first boot-band pawl is, a second boot-band pawl formed in said inner-layer portion of said band body, has an opening into which said top end can be inserted, and a pressing part that presses, from the outside the end that is inserted into said opening, and clamps said band body together with the first boot-band pawl, a slit formed between said first boot-band pawl and the engagement hole in the outer-layer portion of the band, and a temporary-tacking pawl formed on said inner-layer portion of said band body, and is inserted into and engaged with said slit, so that said band body is made to be in a temporary-tacking condition in a ring-like form.

8. The boot band as described in claim 7, wherein an enlarged portion that is on a side of the engagement hole, which has a shape that corresponds to that of a rear face of the engagement pawl, and that is enlarged outward in the radial direction, is formed on an end face at a rear of said engagement hole.

9. The boot band of claim 8, wherein said enlarged portion is formed on an end face in the clamping direction of said engagement hole.

10. The boot band as described in claim 2, wherein an enlarged portion that is on a side of the slit, has a shape that corresponds to that of a back face of the engagement pawl, is enlarged outward in the radial direction is formed on an end face at a rear of said slit.

11. The boot band as described in claim 7, wherein an end-section top portion of said outer-layer portion is curved inward in the radial direction and has a curvature larger than that of a ring-diameter of the band body.

12. A boot band, for clamping on a member comprising:

a band body that rolls up as a ring around the member to be clamped, in such a way that a band body's outer-layer portion overlaps an inner-layer portion of the band body, an engagement hole formed in said outer-layer portion of said band body, an engagement pawl formed in said inner-layer portion of said band body and that engages with said engagement hole so as to maintain said band body in a clamped condition, a first boot-band pawl formed on a top end of the outer-layer portion of said band body, a planar end formed in said outer-layer portion of said band body, and is located nearer to the top end of the outer-layer portion than the first boot-band pawl is, a second boot-band pawl formed in said inner-layer portion of said band body, has an opening into which said top end can be inserted, and a pressing part that presses, from the outside the end that is inserted into said opening, and clamps said band body together with the first boot-band pawl, a reinforcing part formed between said second boot-band pawl and the engagement pawl.

13. The boot band as set forth in claim 12, and wherein said reinforcing part is a rib that is formed between the second boot-band pawl and said engagement pawl, in the circumferential direction.

14. The boot band as described in claim 12, wherein an enlarged portion that is on a side of the engagement hole, which has a shape that corresponds to that of a rear face of the engagement pawl, and that is enlarged outward in the radial direction, is formed on an end face at a rear of said engagement hole.

15. The boot band of claim 14, wherein said enlarged portion is formed on an end face in the clamping direction of said engagement hole.

16. The boot band as described in claim 12, wherein an end-section top portion of said outer-layer portion is curved inward in the radial direction and has a curvature larger than that of a ring-diameter of the band body.

* * * * *